United States Patent [19]

Le Deit

[11] 4,446,947
[45] May 8, 1984

[54] SLIDING CALIPER DISC BRAKE

[75] Inventor: Gérard Le Deit, Aulnay sous Bois, France

[73] Assignee: Societe Anonyme DBA, Paris, France

[21] Appl. No.: 426,517

[22] Filed: Sep. 29, 1982

Related U.S. Application Data

[63] Continuation of Ser. No. 243,223, Mar. 12, 1981, abandoned.

[30] Foreign Application Priority Data

Mar. 14, 1980 [FR] France ................................. 80 05706

[51] Int. Cl.³ .............................................. F16D 65/09
[52] U.S. Cl. ................................. 188/73.34; 188/73.45
[58] Field of Search ............... 188/18 A, 73.31, 73.32, 188/73.33, 73.34, 73.35, 73.36, 73.41, 73.42, 73.43, 73.44, 73.45, 205 A, 106 A, 370; 192/30 V, 70.13

[56] References Cited

U.S. PATENT DOCUMENTS

| | | | |
|---|---|---|---|
| 3,666,058 | 5/1972 | Quiney | 188/106 A |
| 3,835,970 | 9/1974 | Haraikawa | 188/370 |
| 4,072,217 | 2/1978 | Inoue et al. | 188/73.34 |
| 4,082,167 | 4/1978 | Einchcombe et al. | 188/73.34 |
| 4,265,340 | 5/1981 | Scott et al. | 188/73.45 |
| 4,331,221 | 5/1982 | Evans et al. | 188/73.31 |
| 4,334,598 | 6/1982 | Portolese | 188/73.31 |
| 4,344,511 | 8/1982 | Stoka et al. | 188/73.45 |

FOREIGN PATENT DOCUMENTS 2432651 2/1980 France.
1481608 8/1977 United Kingdom.

Primary Examiner—Douglas C. Butler
Assistant Examiner—R. R. Diefendorf
Attorney, Agent, or Firm—Paul David Schoenle; Ken C. Decker

[57] ABSTRACT

The invention concerns a sliding caliper disc brake. The brake comprises a caliper (14) which is mounted slidably on a fixed carrier (10) by at least one axial pin (16) cooperating with a bore (47) formed in the caliper. The bore (47) is provided with a sleeve (46) having a resilient projection (54) which extends radially into a recessed portion (58) of the pin (16) to act as a unidirectional stop which can resiliently assume an inoperative position upon assembly of the brake and thus to prevent the caliper and the fixed caliper becoming separated from each other when preforming operations such as changing the friction elements. In the construction illustrated, the sleeve (46) is made of resilient material and the projection (54) is integral with the sleeve.

The invention is provided for braking motor vehicles.

5 Claims, 4 Drawing Figures

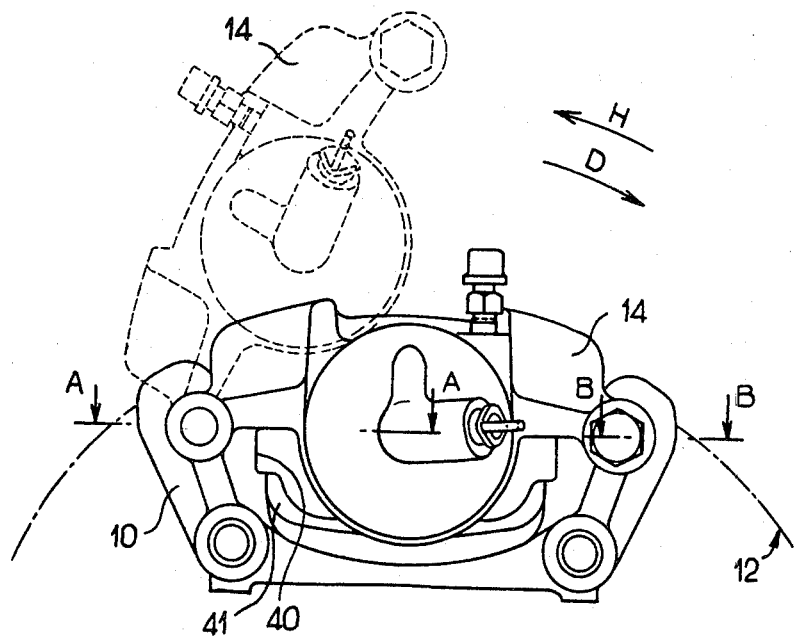
FIG_1
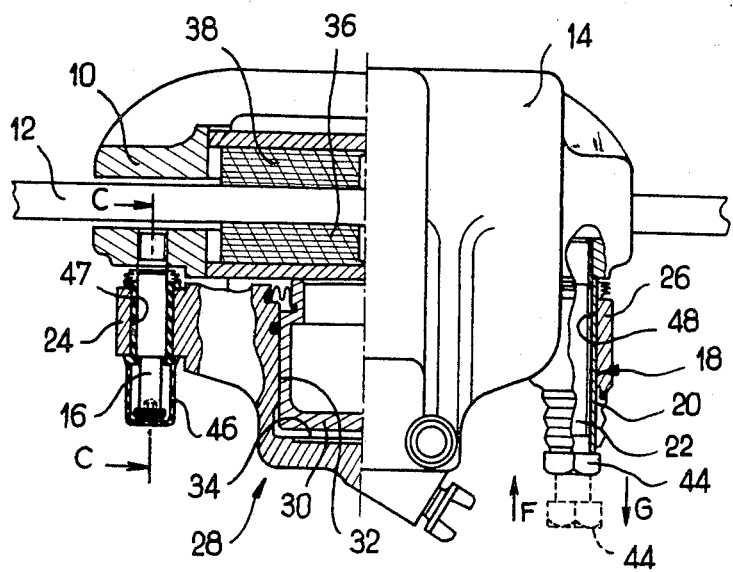
FIG_2

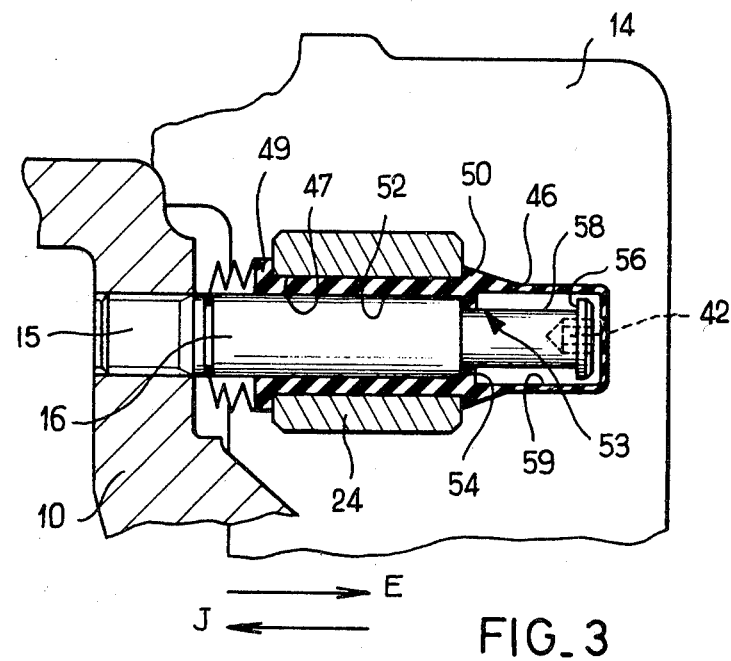
FIG_3
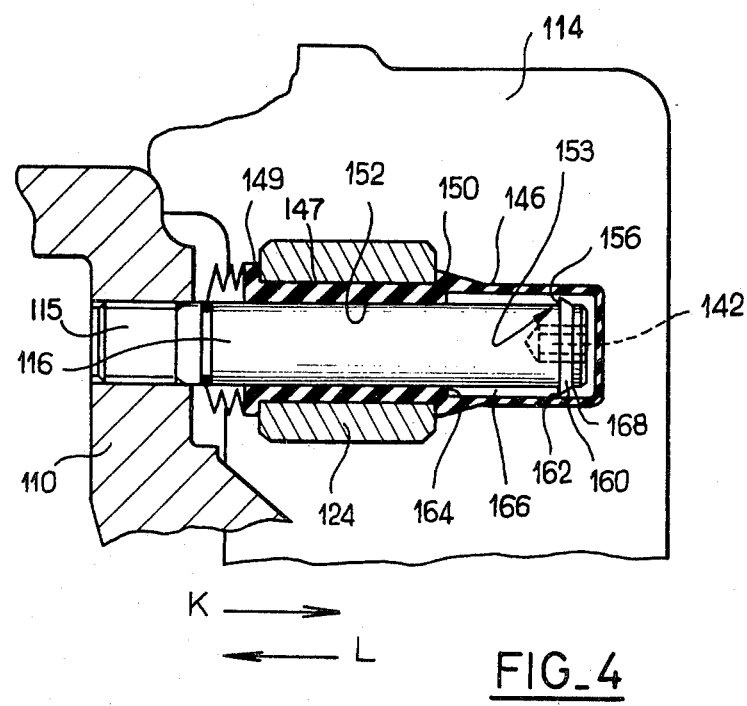
FIG_4

SLIDING CALIPER DISC BRAKE

This application is a continuation of application Ser. No. 243,223 filed Mar. 12, 1981, now abandoned.

The present invention concerns a sliding caliper disc brake in particular for a motor vehicle.

The invention concerns in particular a disc brake wherein the caliper is mounted slidably by means of at least one axial pin on a fixed carrier in which two friction elements are received in an anchored and slidable mode, the friction elements being capable of coming into frictional engagement with the opposite faces of a rotary disc upon actuation of a brake actuating unit acting directly on one of the friction elements and acting on the other friction element by reaction by way of the sliding caliper.

French Pat. No. 77-23127 published under the No. 2,360,012 discloses a disc brake of the above-defined type, wherein two axial pins extend through bores which are provided in a face-to-face configuration in the fixed carrier for the caliper, sliding and protective sleeves being mounted in the bores for co-operation with the pins. In this type of brake, operations such as changing a piston, changing a piston seal and in particular changing the friction elements can involve pivoting the brake caliper, by turning it about one of the axial pins. When the caliper has been pivoted sufficiently to clear the fixed carrier completely, there is the danger of the caliper sliding towards the free end of the pin and thus becoming detached from the fixed carrier. Accidentally dropping the caliper can then cause damage which is difficult to ascertain and which does not always conform with the requirements in respect of reliability which are required in motor vehicle braking systems.

The invention concerns a disc brake of the above-described type, which overcomes such a disadvantage.

For this purpose, the invention proposes a disc brake, which is mounted slidably on a fixed carrier and which comprises two friction elements which are received in an anchored and slidable mode in said fixed carrier and which are capable of coming into frictional engagement with the opposite faces of a rotary disc upon actuation of a brake actuating unit acting directly on one of the friction elements and acting on the other friction elements by reaction by way of the sliding caliper, at least one sliding axial pin which is fixed with respect to the caliper or the fixed carrier and which is received slidably in a corresponding bore formed in the fixed carrier or the caliper, said pin co-operating with the corresponding bore by means of a sleeve which is axially immobilised in said bore, characterised in that said sleeve and said pin comprise unidirectional stop means which are capable of resiliently assuming an inoperative position in order to permit the pin to be axially introduced into the sleeve upon assembly of the brake.

It will be seen therefore that, by virtue of the invention, the sliding movement of the pin relative to the sleeve is limited in order to ensure that the caliper cannot be accidentally dropped.

Two embodiments of the invention will now be described by way of non-limiting example with reference to the accompanying drawings in which FIGS. 1 to 3 show one embodiment and FIG. 4 shows the second embodiment, and in which:

FIG. 1 is a front view of a disc brake in accordance with the invention, showing the brake assembly phases;

FIG. 2 is a plan view of the disc brake of FIG. 1, in which certain parts are shown in cross-section taken along lines A—A and B—B in FIG. 1;

FIG. 3 is a view on an enlarged scale in section taken along line C—C of the stop means shown in FIG. 2; and FIG. 4 is a view on an enlarged scale in section taken along line C—C in FIG. 2 of the stop means, in accordance with a second embodiment.

The disc brake shown in FIGS. 1 to 3 comprises a carrier member 10 which is designed to be associated with a fixed part of the vehicle (not shown) and which, in the embodiment illustrated, is formed by a plate disposed in the vicinity of a disc 12 which is designed to be associated with a wheel (not shown) of the vehicle, for rotary movement therewith. The fixed carrier 10 slidably receives a movable caliper 14 which sits astride the disc. The caliper is slidable on the fixed carrier by means of circumferentially spaced axial pins 16 and 18, the axes of which are substantially parallel to the axis of the disc 12. The pins 16 and 18 are disposed between the fixed carrier 10 and arms 24 and 26 of the caliper 14. The caliper 14 comprises actuating means 28 formed by a hydraulic brake actuating unit comprising a piston 30 which is mounted slidably in a bore 32 defined in the caliper 14, and which is responsive to the pressure obtaining in a control chamber 34 capable of being connected to a pressure source such as for example the master cylinder of a vehicle. The piston 30 is so disposed as directly to urge a first friction element 36 against a first face of the disc 12 when the pressure fluid is introduced into the chamber 34. The caliper 14 is then displaced by reaction and slides on the pins 16 and 18 so as to urge a second friction element 38 against the other face of the disc 12. As can be seen in particular from FIG. 1, the friction element 36 is supported in a slidable and anchored manner by the circumferentially spaced edges 40 of an opening 41 in the fixed carrier 10. The friction element 38 is also received in an anchored and slidable manner on the fixed carrier 10, in an identical fashion. As can be seen more particularly from FIG. 2, the two pins 16 and 18 are associated with the fixed carrier 10 by a screw-thread connection. More precisely, the pins 16 and 18 which permit the sliding movement of the caliper 14 are screwed to the fixed carrier. The hexagonal head 44 of the bolt 22 permits the assembly comprising the sleeve member 20 and the bolt 22 to be screwed to the fixed carrier 10 by means of a corresponding tool (not shown). In the embodiment illustrated, and as can be seen more particularly from FIGS. 3 and 4, the pin 16, 116 is provided on one end with a schematically illustrated screw-threaded region 15, 115 which is intended to be screwed into the fixed carrier 10, 110, while the second free end is provided with a hexagonal socket screw head 42, 142 for enabling the pin to be screwed into the carrier by means of a suitable tool (not shown).

The arms 24 and 26 of the caliper 14 are provided with bores 47 and 48 in which the pins 16 and 18 are respectively fitted.

Referring now to FIG. 3, it will be seen that the bore 47 in the arm 24 is provided with a cylindrical sleeve 46 which is closed at one end and which is fixed with respect to the arm 24 by means of two shoulders 49 and 50 which immobilise the sleeve 46 relative to the arm 24 of the caliper 14. The sleeve 46 is made of resilient material and acts as an anti-noise sleeve. The caliper 14 is slidable on the pin 16 by means of the sleeve 46 and directly on the sleeve member 20 of the pin 18.

In the embodiment illustrated in FIG. 3, and in accordance with the invention, the sleeve 46 and the pin 16 comprise unidirectional stop means 53. The stop means 53 comprise a resilient circumferential projection 54 which is formed integrally with the sleeve 46 and which extends radially from the internal bore 52 of the sleeve into an axial recessed portion 58 provided in the pin 16. More precisely, the axial recessed portion 58 is formed by a radial groove in the pin 16. The recessed portion 58 has an end face 56 whose outside diameter is larger than the inside diameter of the projection 54 on the sleeve 46. The closed end of the sleeve 46 forms a bore 59 whose diameter is larger than the bore 52 of the sleeve 46.

It will be appreciated that the resilient projection 54 will be a component which is mounted to the sleeve 46 when the sleeve is made of a non-resilient material. It will also be appreciated that the projection 54 is not necessarily continuous all around the bore 52 of the sleeve and that it may equally well extend into a radial groove in the pin 16 or into one or more slots formed in the pin 16.

In the embodiment shown in FIG. 4 in which the same components are designated by the same reference but increased by 100, and in accordance with the invention, the sleeve 146 and the pin 116 comprise unidirectional stop means 153. The stop means 153 comprise a resilient ring 160 which is mounted in a circumferential groove provided in a recessed portion 166 formed in the sleeve 146. The circumferential groove in the pin 116 is such that the resilient ring 160 which is of the keeper ring type may be retracted radially into the groove. The keeper ring has a peripheral edge or ridge 162 whose free diameter is larger than the diameter of the bore 152 in the sleeve 146, the edge 162 being disposed facing the surface 164 of the recessed portion 166 of the sleeve 146. The second peripheral edge 168 of the ring 160 has a free diameter which is substantially less than the diameter of the edge 162.

It will be appreciated that the resilient ring which is described as being a keeper ring member may advantageously be replaced by a ring of resilient material, by a circlip or any other member of the same type.

The operation of fitting the caliper 14 to the carrier is effected in the following manner, in regard to the embodiment illustrated in FIGS. 1 to 3:

The pin 16 is already screwed to the fixed carrier 10, and the caliper 14 has been previously fitted with the sleeve 46 in the arm 24 and also the pin 18, the bolt 22 of which is withdrawn as shown in FIG. 2; the caliper is then presented in a pivoted condition as indicated in FIG. 1, with the sleeve 46 being disposed facing the pin 16. The pin 16 is introduced into the sleeve 46 in the direction indicated by arrow E, until it bears against the projection 54. Further axial movement permits the pin to displace the projection 54 resiliently outwardly by a pivotal movement of said projection 54 towards the bore 59 in the sleeve 46, and to continue the operation of introducing the pin, a further movement permitting the projection 54 to engage into the recessed portion 58 of the pin 16. The caliper 14 is then pivoted in the direction indicated by arrow D until the bolt 22 of the pin 18 can be set in place in the fixed carrier 10 by screwing as indicated by arrow F.

For an operation such as for example changing the friction elements, operation will be as follows: the bolt 22 is unscrewed as indicated by arrow G into the position shown in FIG. 2, and the caliper is pivoted as indicated by arrow H in order to assume the position shown in FIG. 1, whereupon removal of the friction elements is possible.

When the caliper is urged in the direction of removal of the pin 16 from the sleeve 46, as indicated by arrow J, the end 56 of the recessed portion 58 bears against the projection 54, and any further movement causes the projection to pivot inwardly of the bore 47 in the arm 24. The projection cannot be moved aside by the very fact that the bore 47 is present, to limit deformation of the sleeve and thus the retraction movement of the projection. The cooperation between the end face 56 of the recessed portion 58 of the pin 16 and the projection 54 performs the function of a unidirectional stop means.

In the embodiment shown in FIG. 4, the caliper 114 is mounted to the carrier 110 in the following manner:

The pin 116 is already screwed to the fixed carrier 110 and the caliper 114 has been previously fitted with the sleeve 146 in the arm 124 and also with the pin 116, the bolt 22 of which is in a withdrawn condition, as shown in FIG. 2; the caliper is then presented in a pivoted condition as shown in FIG. 1, with the sleeve 146 being disposed opposite the pin 116. The pin 116 is then introduced into the sleeve 146 in the direction indicated by arrow K until the resilient ring 160 bears against the bore 152 of the sleeve 146. It is clear that, if the sleeve is made of a resilient material, it can be involved in the retraction movement of the stop means, by deformation of the sleeve. A further axial force permits the resilient ring 160 to be retracted radially into the groove in the pin 116, and to continue the operation of introducing the pin. Movement sufficient to reach the recessed portion 166 of the sleeve 146 permits the resilient ring 160 to return to its free position and to engage into the recessed portion 166 of the sleeve 146. The caliper 14 is then pivoted in the direction indicated by arrow D until the bolt 22 of the pin 18 can be set in place in the fixed carrier 10 by screwing, as indicated by arrow F. For an operation such as for example changing the friction elements, operation will be as follows: the bolt 22 is unscrewed as indicated by arrow G to assume the position as shown in FIG. 2, and the caliper is pivoted in the direction indicated by arrow H to occupy the position shown in FIG. 1, whereupon extraction of the friction elements is possible. When the caliper is urged in the direction of withdrawal of the pin 116 from the sleeve 146, as indicated by arrow L, the face 156 of the resilient ring bears against the end 164 of the recessed portion 166 in the sleeve 146. Any further movement tends to drive the sleeve 146 deeper into the bore 147 in the arm 124. The shoulder 150 opposes movement of the sleeve 146. Co-operation between the face 156 of the resilient ring 160 and the end face 164 of the recessed portion 166 of the sleeve 146 performs the unidirectional stop function.

It will be apparent therefore from the foregoing description that the resilient projection 54 and the recessed portion 58 in the first embodiment and the resilient projection 160 and the recessed portion 166 in the second embodiment act as unidirectional stops which are moved into an inoperative retracted position for assembly of the brake and prevent the caliper and the fixed carrier from accidentally becoming separated from each other.

I claim:

1. A disc brake having a caliper member which is mounted slidably on a fixed carrier member, comprising two friction elements which are mounted in an anchored and slidable mode in said fixed carrier member and which are capable of coming into frictional engagement with the opposite faces of a rotary disc upon actuation of a brake actuating unit acting directly on one of the friction elements and acting on the other friction element by reaction by way of the sliding caliper member, at least one sliding axial pin which is fixedly secured at one end with respect to one of said members and which is received slidably in a corresponding bore formed in the other of said members, said pin co-operating with the corresponding bore by means of a sleeve of resilient material which is axially immobilized in said bore, characterized in that said pin includes a second end opposite said one end and said second end cooperates with said sleeve of resilient material to form unidirectional stop means which is capable of resiliently assuming an inoperative condition to permit the pin second end to be axially introduced into the sleeve upon assembly of the brake, and said unidirectional stop means assuming an operative condition to resiliently oppose withdrawal of said pin second end from said sleeve and said unidirectional stop means is axially disposed outside said other member bore in the operative condition.

2. A disc brake according to claim 1 characterized in that said stop means comprise a resilient projection which extends radially between said sleeve and said pin for co-operating with a stop surface which defines an abutment between said pin and said sleeve to prevent the pin from accidentally escaping.

3. A disc brake according to claim 2 characterized in that said resilient projection extends radially from said sleeve into an axial recessed portion provided in said pin, said stop surface being formed by an end face of said axial recessed portion.

4. A disc brake according to claim 2 characterised in that said resilient projection extends radially from said pin into an axial recessed portion provided in said sleeve, said stop surface being formed by an end face of said axial recessed portion.

5. A disc brake according to claim 4 characterised in that said resilient projection comprises a resilient ring which is mounted in a groove in said pin, into which said ring is capable of being radially retracted when said pin is introduced into said sleeve.

* * * * *